United States Patent [19]

Hutton

[11] 4,420,583

[45] Dec. 13, 1983

[54] ACID CONTAINING EMULSION COPOLYMER CROSSLINKED BY A HALOHYDROXYPROPYL AMMONIUM SALT SOLUTION POLYMER

[75] Inventor: Thomas W. Hutton, Doylestown, Pa.

[73] Assignee: Rohm and Haas Company, Philadelphia, Pa.

[21] Appl. No.: 391,659

[22] Filed: Jun. 24, 1982

[51] Int. Cl.$^3$ .......................... C08J 3/02; C08K 3/20
[52] U.S. Cl. .................................. 524/501; 523/408; 524/517; 524/519; 428/262; 428/272; 428/290
[58] Field of Search .............. 523/408; 524/519, 501, 524/521, 523, 517, 524, 522; 525/329, 378, 208, 213; 526/206, 317, 292.2; 260/348; 428/262, 272, 290

[56] References Cited

U.S. PATENT DOCUMENTS 3,678,098  7/1972  Lewis et al. .................. 526/312
4,200,562  7/1980  Yoshioka et al. ............. 526/292.2

Primary Examiner—Joseph L. Schofer
Assistant Examiner—J. M. Reddick
Attorney, Agent, or Firm—Michael B. Fein

[57] ABSTRACT

A composition useful in coatings, binders, adhesives, and the like comprises a stable blend of a carboxylic acid copolymer emulsion and a halohydroxy propyl ammonium copolymer solution. The blend is curable, after activation by base, to a crosslinked insoluble alloy polymer.

13 Claims, No Drawings

ACID CONTAINING EMULSION COPOLYMER CROSSLINKED BY A HALOHYDROXYPROPYL AMMONIUM SALT SOLUTION POLYMER

BACKGROUND OF THE INVENTION

1. Field of the Invention

This invention relates to room temperature curable coating compositions, fabric binders, and adhesives.

2. Description of the Prior Art

Most high quality, highly crosslinked film-forming polymers to date have been cured with aminoplasts. However, due to problems with the use of formaldehyde, new coating, adhesive, and binder compositions have been needed which meet the performance specifications of such aminoplast compositions without the use of formaldehyde.

Low energy curing ("LEC") compositions which are formaldehyde-free have been previously suggested, but are, for the most part, relatively costly and do not perform adequately for many applications.

Oil soluble low temperature curing quaternary ammonium monomers have been described in a recent patent application of Thomas W. Hutton and Richard F. Merritt filed Aug. 7, 1981, Ser. No. 291,010, as have been homopolymers, copolymers of such monomers, and copolymers of such monomers with other ethylenically unsaturated monomers in the manner shown in U.S. Pat. No. 3,678,098 incorporated herein by reference. The patent also teaches activation of such polymers by raising the pH to make reactive and readily crosslinked coatings, binders, and adhesives.

Halohydroxypropyl dialkyl-ar-vinylphenylenylalkylenyl quaternary ammonium compounds, polymers thereof and uses of such polymers are taught by D. A. Winey in Patent Application Ser. No. 291,142 filed Aug. 7, 1981. The polymers are particularly useful as wet-strength agents in the making of paper.

Monoethylenically unsaturated quaternary ammonium monomers wherein the unsaturated group is an allyl or a double bond functionally equivalent to an isolated vinyl group, and thus readily polymerizable with vinyl acetate to provide emulsion polymers capable of low energy cure, are taught in the U.S. Patent Application of T. W. Hutton, Ser. No. 291,143 filed Aug. 7, 1981. The invention is also directed to addition polymers of such monomers and to methods of producing the monomers and the polymers. The polymers are useful, for example, as wet-strength agents in the making of paper.

A composition comprising a blend of (a) an emulsion acid copolymer and (b) an emulsion halohydroxypropyl ammonium copolymer, at least one of (a) or (b) being film forming at room temperature is taught in a U.S. Patent Application by M. L. Gioeni et. al. Ser. No. 320,283 filed Nov. 12, 1981. The invention also comprises activating the composition with base and applying the composition to a substrate to form a tough, solvent-resistant film on the substrate.

An object of the present invention is to provide low energy cured, high performance coatings, binders, and adhesives in formaldehyde-free systems having very high performance such as that of the aminoplast systems.

An additional object is to provide a unique process for activating and reacting such compositions which provides a long open time, and a stable formulation.

Another object is to provide films, coatings, binders, and adhesives which have excellent mechanical and chemical properties such as tensile strength and solvent resistance.

These objects, and others which will become apparent from the following disclosure, are achieved by the present invention which comprises in one aspect a composition comprising a blend of (a) an acid copolymer emulsion, and (b) a halohydroxypropyl ammonium salt copolymer solution. In other aspects, the invention comprises activating the composition with base and then applying to a substrate. In another aspect, the invention comprises the tough, solvent resistant films prepared by the process, and articles employing the films, coatings, binders or adhesives of this invention.

Employing a solution of the quaternary ammonium salt polymer permits the use of the relatively expensive quaternary ammonium salt component with high efficiency and effectiveness. This component polymer being in solution, can effectively enter any nooks and crannies created in the emulsion polymer particles during the drying of the blend. This effectiveness in crosslinking also has the effect of permitting the use of a lower carboxylic acid content in the emulsion polymer thus increasing the water and strong solvent resistance of that component and, thereby, of the product. Of particular utility, is the ability to use readily available quaternary ammonium salts, as crosslinking components in the solution polymer, to crosslink an emulsion polymer comprising monomers not readily copolymerizable with said readily available quaternary ammonium monomers.

BRIEF DESCRIPTION OF THE INVENTION

The composition of this invention comprises a carboxylic acid functional polymer emulsion and a solution polymer of a halohydroxypropyl quaternary ammonium salt monomer. The solution polymer is used to crosslink the particles of the polymer emulsion to form a highly crosslinked final polymer having mechanical properties which reflect those of the particles and also show the effect of crosslinking. A preferred process comprises forming a mixture of the polymer emulsion and a solution, in a aqueous medium, of the solution polymer, then drying the said mixture, preferably on a substrate. In other aspects, the invention is to the final polymer produced by drying and curing the mixture and also the final polymer in conjunction with a substrate.

DETAILED DESCRIPTION OF THE INVENTION

The halohydroxypropyl ammonium polymer for use in this invention is prepared by homopolymerization or copolymerization of a quaternary ammonium monomer of the formula:

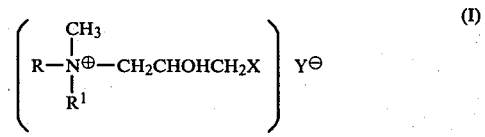

or

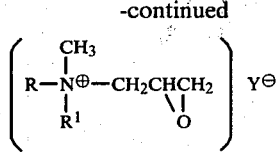

wherein

R is an ethylenically unsaturated organic group;

$R^1$ is a linear $C_1$ to $C_4$ alkyl group, optionally hydroxy substituted;

X is chlorine, bromine, iodine or a functional equivalent of a halogen;

Y is an anion.

R can be $CH_2=C(R^4)-C(O)Z-A-$ wherein $R^4$ is hydrogen or methyl;

Z is oxygen or $-NR^5-$ wherein $R^5$ is hydrogen or $C_nH_{2n+1}$;

n is 1 to 10; and

A is a $C_2-C_4$ alkylene or a polyoxyalkylene group of the formula $-(CH_2CH_2O)_xCH_2CH_2-$ wherein x is 1 to 100; or R can be

$$R^3-CH_2-(CHR^2)_n-CH_2- \quad (III)$$

wherein n is 0 to 1;

$R^2$ is H or OH; and $R^3$ is an alkenoxy group containing an allyl group or a carbalkenoxy group containing a double bond functionally equivalent to an isolated vinyl group; or R can be

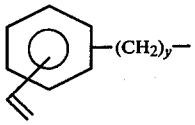

wherein y is an integer from 1 through 4.

Preferably, the quaternary ammonium monomer is the readily available reaction product of dimethylaminoethyl methacrylate with nitric acid and epichlorohydrin or epichlorohydrin and propylene oxide.

The polymer of the quaternary ammonium monomer may be prepared by known methods of free radical polymerization of unsaturated monomers. Preferably the polymers are prepared by solution polymerization in an aqueous medium. The polymers so prepared may be mixed directly with the latex polymer. The polymers prepared in other media or by other methods are dissolved in an aqueous medium before admixture with the latex system. The medium chosen is such that the latex is not destabilized in forming the mixture. The term polymer solution here is not used in the strict sense that the polymer particles be in complete solution although that is preferred. It is sufficient if the polymer molecules are highly swollen so as to readily react with and penetrate interstices amongst the latex particles during drying of the mixture. Complete solution of the polymer comprising of a quaternary ammonium unit is, however, preferred.

The choice of the ethylenically unsaturated organic group R in formulas I and II above may be made on the basis of ease of copolymerization with a desired comonomer or comonomers. Those skilled in the art appreciate that such choice may be made by the aid of the Q and e scheme widely employed to predict reactivity ratios amongst monomers in the preparation of copolymers. The scheme is outlined in *Organic Chemistry of Synthetic High Polymers* by R. W. Lenz, Inter-science, 1967 and *Short Course in Polymer Chemistry* by J. K. Stille et. al., American Chemical Society, 1975 both herein incorporated by reference.

The suitable comonomers are any ethylenically unsaturated monomers except acids or anhydrides, since essentially all of the acid should be in the emulsion acid copolymer. Examples of comonomers are acrylate esters, preferably of $C_1-C_8$ alcohols such as ethyl acrylate, methacrylate esters, preferably of $C_1-C_8$ alcohols such as methyl methacrylate, aromatic monomers styrene, alkyl styrenes, vinyl esters, preferably of $C_1-C_{12}$ acids such as vinyl acetate, unsaturated amides such as acrylamide and methacrylamide, acrylonitrile, vinylidene chloride, N-vinylpyrolidone, maleate esters, preferably of $C_1-C_8$ alcohols, fumarate esters, preferably of $C_1-C_8$ alcohols, propylene, ethylene and other olefins, vinyl chloride, vinyl toluene, and the like. The most preferred monomers are acrylates of $C_2-C_4$ alcohols, styrene and acrylamide.

On a weight basis, the amount of quaternary ammonium monomer in the solution copolymer should be at least 10%, with over 50% being preferred and over 90% most preferred. In any event, the copolymer in the solution should have at least two quaternary groups per number average molecule with at least four being preferred.

The quaternary polymer solution is blended with acid copolymer emulsion in a ratio of about 1:1000 to 1:1, preferably 1:200 to 1:10; more preferably 1:100 to 1:30 by weight on a polymer solids basis.

The emulsion acid copolymer is prepared by polymerizing one or more of the suitable comonomers mentioned above, preferably methyl methacrylate, an acrylate of a $C_2-C_4$ alcohol, vinyl acetate and/or styrene, with a minor amount of an unsaturated acid monomer, among which are monocarboxylic acids, preferably acrylic, methacrylic, crotonic and half esters of maleic and fumaric, with acrylic acid and methacrylic acid being most preferred; as well as polycarboxylic acids such as maleic, fumaric, and, preferably, itaconic. The amount of acid monomer in the emulsion copolymer is about 0.1 to 20 percent by weight, preferably 0.2 to 10, and more preferably 0.3 to 5 percent. The surfactant employed in the latex is preferably nonionic The well-known processes for the preparations of emulsion polymers are used to prepare the acid copolymer emulsions. H. Warson in "The Applications of Synthetic Resin Emulsions", Ernest Benn Limited, London 1972 and C. E. Schildknecht in "Vinyl and Related Polymers", John Wiley and Sons, Inc. New York 1952 teach suitable emulsion polymerization processes, which processes are incorporated herein by reference.

The mixture of the acid copolymer emulsion and the solution polymer is stable when blended, the blend usually having a pH below 6. By addition of a base, the pH is raised and the solution polymer is activated for curing. Preferable bases are sodium hydroxide, potassium hydroxide, sodium sesquicarbonate and sodium bicarbonate, other useful base compounds are MgO, MgCO$_3$, CaO, CaCO$_3$, ZnO, BaO and Ba(OH)$_2$; the base need not be water soluble. The preferred pH after activation is about 9 to about 10, the mixture is ordinarily stable for at least one shift (8 hours) and most often for weeks at this pH at room temperature.

Generally the compositions can be cured with relatively low energy, usually at room temperature or slightly above, such as "force drying", at up to about 250° F., or drying at up to about 350° F., to form excellent coatings, binders, adhesives, and the like.

In a preferred embodiment when the solution and emulsion polymers are properly selected, they are not mutually soluble or compatible, and an alloy is formed in the cured product. This alloy has outstanding properties, such as excellent water resistance, organic solvent resistance, thermal stability and toughness.

The polymer mixtures of this invention are particularly useful to make clear or pigmented coatings for use on soft substrates such as vinyls, leather, and paper, as well as on hard substrates such as wood, metal, mineral, and road surfaces. The coating, in these uses, serves decorative and/or protective purposes, such as wear resistance, solvent resistance, detergent resistance, abrasion resistance, appearance improvement, etc. As pigment print binders, the polymers are useful in printing inks which furnish durable design or decoration for woven or non-woven fabrics, films, rigid panels, etc. Fibers of either synthetic or natural materials such as polyolefins, polyesters, rayon, nylon, fiberglass, wood, wool, and the like may be bonded by means of the compositions of the invention to furnish non-woven fabrics, particularly those of high durability for uses such as clothing interliners, fiberfill insulation, filer material, diaper components, and various forms of wearable and decorative fabrics. Used alone or in formulations, these compositions offer strong and durable adhesives particularly useful for the lamination of fabrics, woven or non-woven, films, hard panels, foamed materials, and the like, in any combination to form two-layer or multi-layer laminates. Employed as a flock adhesive, or a component thereof, the composition serves to adhere fiber flocks of materials such as nylon, polyester or rayon to a substrate, such as woven fabric, non-woven fabric, rigid panels and foams. Towels, wipes, and other paper products with good mechanical strength and water resistance are made by binding wood fibers, or mixtures or wood fibers with other fibers, employing the instant composition as binders.

The following examples are presented to illustrate a few embodiments of the invention; although the invention is certainly not limited to the few illustrated embodiments. All parts and percentages are by weight unless otherwise indicated.

EXAMPLE 1—99.85 EA/0.15 MMA

A 5-liter stirred flask, equipped for charging reactants and for temperature regulation, was swept with nitrogen and charged with 983 g deionized water, 51.3 g octylphenoxypoly(39)ethoxyethanol (OPE40) (70% in water), a solution of 72 g of 0.1% ferrous sulfate heptahydrate and 19.8 g of 1% aqueous ethylenediamine tetraacetic acid, 1.5 g concentrated sulfuric acid, 360 g ethyl acrylate (EA), and 2.6 g diisobutylbenzene hydroperoxide (DIBHP). The flask contents were cooled to 20° C. and an activator solution of 0.72 g sodium sulfoxylate formaldehyde (SSF) in 40 g of water was added. An exothermic reaction carried the temperature to 60° C., where it was held for five minutes before adding a stabilizer solution of 51.3 g OPE40 (70%) in 67.6 g of water. Over the next three hours a monomer emulsion consisting of 732 g deionized water; 51.3 g OPE40 (70%); 2.7 g methacrylic acid (MAA); 1437 g EA; an initiator, 10.5 g DIBHP; and an activator solution consisting of 2.88 g SSF dissolved in 100 g of water were fed at a constant rate while maintaining a reaction temperature of 58° to 62° C. At the end of the polymerization, a free radical chaser is employed to decrease the level of unreacted monomers; the flask contents are cooled and 4.5 g sodium acetate dissolved in 10 g water is added. The final polymer emulsion has a pH of 4.3, a solids of 46.9%, and a viscosity of 40 cps.

EXAMPLE 2—99.2 EA/0.8 MMA

Prepared in the manner of Example 1 except with a monomer charge of 1785 g EA and 14.4 g MAA.

EXAMPLE 3—98.5 EA/1.5 MAA

Prepared in the manner of Example 1 except with a monomer charge of 1772 g EA and 27 g MAA.

EXAMPLE 4—89.2 EA/10 AN/0.8 MAA

A 51% solids emulsion polymer stabilized with 6% OPE40 was prepared from 1959 g EA, 220 g acrylonitrile (AN) and 17.6 g MAA by the gradual addition redox process of Example 1 but using t-butyl hydroperoxide (tBHP) and SSF as initiator.

EXAMPLE 5—88.88 EA/10.26 AN/0.86 IA

A 53% solids emulsion polymer stabilized with 4.8% OPE40 was prepared from 1910 g EA, 220 g AN and 18.5 g itaconic acid (IA) by a gradual addition redox process of Example 4 using tBHP and SSF as initiator.

EXAMPLE 6-99.8 EA/0.2 IA

A 60% solids emulsion polymer stabilized with 3.3% OPE40 was prepared from 2395 g EA and 4.8 g IA by the process of Example 4.

EXAMPLE 7-99.4 EA/0.6 IA

A repeat of Example 6 except with a monomer charge of 2386 g EA and 14.4 g IA.

EXAMPLE 8-99.6 VA/0.4 IA

Prepared from 1912 g of vinyl acetate (VA) and 7.7 g IA at 47% solids and stabilized with 5% OPE40 by the process used in Example 4.

EXAMPLE 9-99.6 VA/0.4 AA

Prepared as in Example 8 except replacing IA with acrylic acid (AA).

EXAMPLE 10-29.6 E/68.4 VA/2 AA

A 52% solids emulsion polymer of composition 29.6 ethylene (E)/68.4 VA/2 AA stabilized with 2.8% of a surfactant mixture composed of 2 parts Igepal ®CO-970 and 1 part Abex ®26S was prepared by a continuous polymerization process using tBHP and SSF as initiator. Igepal ®CO-970 is a nonylphenoxypoly(ethyleneoxy)ethanol, a nonionic surfactant manufactured by GAF corporation having a hydrophil-lypophil balance of 18.2. Abex ®26S is an anionic surfactant manufactured by Alcolac, Inc. The preparation of ethylene/vinyl acetate copolymers are well known to those skilled in the art and are taught in U.S. Pat. Nos.

3,440,200 and 3,526,358, herein incorporated by reference.

EXAMPLE 11—25.5 E/72.5 VA/2 AA

An emulsion polymer of composition 25.5 E/72.5 VA/2 AA was prepared as in Example 10 except ammonium persulfate/SSF was the initiator.

EXAMPLE 12—22.6 E/75.2 VA/2.2 AA

An emulsion polymer of composition 22.6 E/75.2 VA/2.2 AA was prepared as in Example 10 except ammonium persulfate/sodium bisulfite was the initiator.

EXAMPLE 13—79.4 VA/20 BA/0.6 AA

A 46% solids emulsion polymer stabilized with 0.94% Abex 26S and 1.87% Igepal CO-977 was prepared from 1270 g VA, 320 g butyl acrylate (BA) and 9.6 g AA by a gradual addition redox process as in Example 4 but using tBHP and SSF as initiator.

EXAMPLE 14—79.7 VA/20 BA/0.3 IA

Prepared as in Example 13 from 1275 VA, 320 g BA and 4.8 g IA and stabilized with 1.8% OPE40 and 1% Abex 26S.

EXAMPLE 15—100 EA

Prepared as in Example 6 with 2400 g EA.

EXAMPLE 16—99.95 EA/0.5 IA

Prepared as in Example 6 from 2399 g EA and 1.2 g IA.

EXAMPLE 17—80 VA/20 BA

Prepared from 1380 g VA and 320 g BA at 46% solids and stabilized with 5% OPE40 by the process used in Example 4.

EXAMPLE 18—79.8 VA/20 BA/0.2 AA

Prepared by the process of Example 17 with 1277 g VA, 320 g BA and 3.2 g AA.

EXAMPLE 19–79.4 VA/20 BA/0.6 AA

Prepared by the process of Example 17 with 1270 g VA, 320 g BA and 9.6 g AA.

EXAMPLE 20–79.8 VA/20 BA/0.2 IA

Prepared by the process of Example 17 with 1277 g VA, 320 g BA and 3.2 g IA.

EXAMPLE 21—POLY(QUATERNARY AMMONIUM NITRATE)

A quaternary chlorohydroxypropyl ammonium nitrate salt monomer was prepared as in Example 4 of U.S. Pat. No. 3,678,098, herein incorporated by reference, except for the use of nitric acid in place of hydrochloric acid. At the completion of the reaction, the product was diluted to 28.9% solids. In a flask swept with nitrogen was placed 2600 g of the quaternary ammonium solution, 8 drops of conc. nitric acid, 220 g 0.1% $FeSO_4.7H_2O$, 2.2 g SSF and 4.8 g tBHP. In nine minutes the temperature rose from 23° to 33° and 60 minutes later the contents were cooled and analyzed. The polymer solution contained 22.9% solids, 0.003 meq/g chloride ion, 0.606 meq/g hydrolyzable chloride and had a bromine number of 0.49.

EXAMPLE 22—POLY(QUATERNARY AMMONIUM ACETATE)

A quaternary chlorohydroxypropyl ammonium acetate salt monomer was prepared as in Example 21 except for the use of acetic acid in place of nitric acid at 47.3% solids. In a flask swept with nitrogen was placed 187.5 g of the quaternary ammonium solution, 456 g water, 55 g 0.1% $FeSO_4.7H_2O$, 0.55 g SSF in 55 g of water, and 1 g tBHP. Twenty-five minutes later the temperature had increased from 25.5° to 28.5°. The final polymer solution had 12.2% solids.

EXAMPLE 23—PROPYLENE OXIDE ANALOG OF EXAMPLE 22

A quaternary hydroxypropyl ammonium acetate salt monomer was prepared as in Example 22, except for the use of propylene oxide in place of epichlorohydrin, at 25.9% solids. In a flask swept with nitrogen was placed 94.1 g of the quaternary ammonium salt solution, 91 g water, 18 g 0.1% $FeSO_4.7 H_2O$, 0.18 g SSF in 18 g water and 18 drops tBHP; the temperature rose 3° C. The calculated solids of the final polymer solution is 10.9%.

EXAMPLE 24—COPOLYMER OF AM AND EX. 21 MONOMER

A copolymer solution was prepared by adding over a period of one hour to a flask swept with nitrogen, 187.8 g of a 31.5% solids solution of the monomeric quaternary chlorohydroxypropyl ammonium nitrate salt prepared as in Example 21, 40.6 g acrylamide (AM), 65 g water and 0.58 g tBHP. Contained in the flask was a charge of 100 g of water and 25 g of 0.1% $FeSO_4.7 H_2O$. Fed to the flask at the same time as the monomer/peroxide solution was a solution of 0.27 g SSF in 60 g water. Contents of the flask were kept at 60°-62° C., during the addition. The final polymer solution contained 20.7% solids, 0.0046 meq/g of chloride ion, 0.373 meq/g of hydrolyzable chloride and had a bromine number of 0.16. The quaternary ammonium salt content of the copolymer is calculated to be 11.8%.

EXAMPLE 25— COPOLYMER OF AM AND EX. 21 MONOMER

A copolymer solution was prepared by adding over a period of one hour to a flask swept with nitrogen, 112.8 g of a 31.5% solids solution of monomeric quaternary chlorohydroxypropyl ammonium nitrate salt prepared as in Example 21, 64.5 g AM, 116 g water and 0.58 g tBHP. Contained in the flask was a charge of 100 g of water and 25 g of 0.1% $FeSO_4. .7 H_2O$. Fed to the flask simultaneously with the monomer/peroxide solution was a solution of 0.27 g of SSF in 60 g of water. Contents of the flask were kept at 60°-62° C., during the addition. The final polymer solution contained 21.1% solids, 0.0044 meq/g of chloride ion, 0.2018 meq/g of hydrolyzable chloride. The quaternary ammonium salt content of the copolymer is calculated to be 6.2%.

EXAMPLES 26–101

The volume swelling ratio of cured blends of the emulsion polymers of Example 1 to 20 with the quaternary ammonium salt polymers of Example 21 to 25 were determined by diluting the emulsion to 40% solids, adding the calculated quantity of the quaternary ammonium salt polymer, adjusting the pH of the mixture to 9-10 with a 15% solution of sodium sesquicarbonate, and preparing pellets of this activated mixture by placing about 0.8 g of the blend in a spot test plate, air drying for several days and final drying at 60° C. for 2 hours. The dried, cured, ca. 1.5 cm dia. pellets were weighed then allowed to swell in excess of the swelling solvent for four days and the weight of the swollen pellet determined. The volume swelling ratio (VSR) was calculated from the following relationship:

$$VSR = \frac{\text{Swollen pellet weight} \times \text{polymer density}}{\text{Unswollen pellet weight} \times \text{solvent density}}$$

The compositions and results are in the following table where compositions which dissolved are indicated by a VSR of D.

NOTES FOR EXAMPLES 26–101

Example 27 indicates 0.15% copolymerized methacrylic acid is insufficient to result in an effectively crosslinked polymer of ethyl acrylate.

Examples 28, 36, 46, 51, 79, 87, 92 and 97 indicate a lack of effective crosslinking in the absence of the poly(-halohydroxypropyl quaternary ammonium salt).

Example 82 indicates that the monomeric form of the quaternary ammonium salt is inadequate.

Example 35 indicates that the poly(quaternary ammonium salt) must contain a halohydroxypropyl moiety.

| Example No. | Emulsion Polymer From Ex. No. | Quaternary Ammonium Polymer From Ex. No. | Wt. %[c] | Volume Swelling Ratio[d] In DMF | In $C_6H_5Cl$ | Other |
|---|---|---|---|---|---|---|
| 26 | 1 | none | — | D | D | |
| 27 | 1 | 21 | 3 | D | D | |
| 28 | 2 | none | — | D | D | |
| 29 | 2 | 21 | 1 | 15.5 | 17 | |
| 30 | 2 | 21 | 1 | 15.5 | 17 | |
| 31 | 2 | 21 | 6 | 12.3 | 14.3 | |
| 32 | 2 | 21[a] | 3 | D | D | |
| 33 | 2 | 22 | 1 | D | D | |
| 34 | 2 | 22 | 3 | 10.4 | 12.4 | |
| 35 | 2 | 23 | 3 | D | D | |
| 36 | 3 | none | — | D | D | |
| 37 | 3 | 21 | 3 | 9.3 | 8.5 | |
| 38 | 3 | 21[a] | 3 | D | D | |
| 39 | 4 | 21 | 0.3 | D | D | 1.6 (PCE) |
| 40 | 4 | 21 | 1 | 13.8 | 12. | 1.65 (PCE) |
| 41 | 4 | 21 | 3 | 13.2 | 11.0 | 1.9 (PCE) |
| 42 | 4 | 23 | 3 | D | D | |
| 43[b] | 4 | 22 | 3 | D[b] | D[b] | |
| 44 | 4 | 22 | 3 | 11.3 | 7.2 | |
| 45 | 5 | 21 | 3 | 5.9 | 5.2 | |
| 46 | 6 | none | — | — | D | |
| 47 | 6 | 21 | 0.3 | — | 14.0 | |
| 48 | 6 | 21 | 0.75 | — | 9.1 | |
| 49 | 6 | 21 | 3 | — | 8.6 | |
| 50 | 7 | 21 | 3 | — | 9.6 | |
| 51 | 8 | none | — | D | — | D (EtOAc) |
| 52 | 8 | 21 | 1.5 | 12.8 | D | 11.2 (EtOAc) |
| 53 | 8 | 21 | 3 | 13.9 | — | 14.3 (EtOAc) |
| 54 | 8 | 21 | 4.5 | 12.5 | — | 10.5 (EtOAc) |
| 55 | 9 | 21 | 1.5 | 16.2 | 12.2 | 13.3 (EtOAc) |
| 56 | 9 | 21 | 3 | 14.8 | 12.3 | 11.0 (EtOAc) |
| 57 | 9 | 21 | 4.5 | 13.7 | 11.5 | 12.0 (EtOAc) |
| 58[b] | 10 | 21 | 3 | D[b] | D[b] | |
| 59 | 10 | 21 | 3 | 6.8 | 6.8 | |
| 60[b] | 11 | 21 | 3 | D[b] | D[b] | |
| 61 | 11 | 21 | 3 | 8.6 | 7.4 | |
| 62[b] | 12 | 21 | 3 | D[b] | D[b] | |
| 63 | 12 | 21 | 3 | 8.2 | 8.7 | |
| 64 | 13 | 21 | 1 | 11.6 | 10.2 | |
| 65 | 13 | 21 | 3 | 10.4 | 9.2 | |
| 66 | 13 | 24 | 1 | 24.8 | 25.1 | |
| 67 | 13 | 24 | 3 | 19.0 | 17.4 | |
| 68 | 13 | 25 | 1 | 31.2 | 27.9 | |
| 69 | 13 | 25 | 3 | 23.0 | 20.4 | |
| 70 | 14 | 21 | 1 | 10.3 | 9.2 | |
| 71 | 14 | 21 | 3 | 7.8 | 6.6 | |
| 72 | 14 | 24 | 1 | D | D | |
| 73 | 14 | 24 | 3 | 20.5 | 19.5 | |
| 74 | 14 | 25 | 1 | D | D | |
| 75 | 14 | 25 | 3 | 36.1 | 29.8 | |
| 76 | 15 | none | — | D | D | |
| 77 | 15 | 21 | 1.5 | D | D | |
| 78 | 15 | 21 | 3 | D | D | |
| 79 | 16 | none | — | D | D | |
| 80 | 16 | 21 | 0.38 | — | 21 | |
| 81 | 16 | 21 | 0.75 | — | 17 | |
| 82 | 16 | 21 | 1.5 | 10.7 | 13.2 | |
| 82 | 16 | 21 | 3 | 8.8 | 9.6 | |
| 84 | 17 | none | — | D | — | D (EtOAc) |
| 85 | 17 | 21 | 1.5 | D | — | D (EtOAc) |
| 86 | 17 | 21 | 3 | D | — | D (EtOAc) |
| 87 | 18 | none | — | D | — | D (EtOAc) |
| 88 | 18 | 21 | 0.38 | 41.5 | — | 30.5 (EtOAc) |
| 89 | 18 | 21 | 0.75 | 35.1 | — | 27.1 (EtOAc) |
| 90 | 18 | 21 | 1.5 | 30.4 | — | 22 (EtOAc) |
| 91 | 18 | 21 | 3 | 25.8 | — | 18.7 (EtOAc) |
| 92 | 19 | none | — | D | — | D (EtOAc) |
| 93 | 19 | 21 | 0.38 | 20.1 | — | 12.2 (EtOAc) |
| 94 | 19 | 21 | 0.75 | 20.6 | — | 9.9 (EtOAc) |
| 95 | 19 | 21 | 1.5 | 8.8 | — | 5.7 (EtOAc) |
| 96 | 19 | 21 | 3 | 8.7 | — | 5.4 (EtOAc) |
| 97 | 20 | none | — | D | — | D (EtOAc) |
| 98 | 20 | 21 | 0.38 | 13 | — | 11.3 (EtOAc) |
| 99 | 20 | 21 | 0.75 | 13.7 | — | 8.3 (EtOAc) |
| 100 | 20 | 21 | 1.5 | 8.4 | — | 5.6 (EtOAc) |
| 101 | 20 | 21 | 3 | 8.1 | — | 5.0 (EtOAc) |

[a]The monomeric form of the chlorohydroxypropyl quaternary ammonium salt was used in the blend.
[b]The blend was not activated by adding sodium sesquicarbonate.
[c]Weight percent of quaternary ammonium polymer solids on emulsion polymer solids.
[d]Swelling solvents: DMF is dimethyl formamide, $C_6H_5Cl$ is chlorobenzene, PCE is perchloroethylene, and EtOAc is ethyl acetate.

Examples 76–78 and 84–86 indicate the requirement for the presence of copolymerized acid in the polymer.

Examples 34 and 44 indicate that the anion of the poly(quaternary ammonium salt) may be acetate.

Examples 66–69, and 72–75 indicate that the poly(-quaternary ammonium salt) may be a copolymer containing acrylamide.

EXAMPLES 102— FABRIC LAMINATE ADHESIVE

The polymers from Example 10 and 11 were blended with 3% (based on solids) of the chlorohydroxypropyl quaternary ammonium polymer of Example 21, adjusted to pH 9–10 with 10% sodium hydroxide, and thickened to a viscosity of 20,000 cps with a nonionic thickener, hydroxyethylcellulose.

A fabric laminate construction using the blend was prepared by coating a 20-mil wet film on cotton twill (bleached, mercerized, 1.32 yds. per lb., style 432 from Test Fabrics, Inc.) by means of a Gardner knife. The laminate was then folded in half onto itself, pressed lightly with a roller to squeeze out bubbles but not exude adhesive. The laminate was dried for four minutes at 200° F. and cured 5 minutes at 250° F. The cohesive strength of the polymer blend was measured by the peel strength of a one-inch strip of the laminate dry and when soaked (one hour) in perchloroethylene in an Instron test machine with a crosshead speed of one inch per minute. The test results are in Table 1.

TABLE 1

Crosslinked Blends

| Polymer from Example No. | Quaternary Ammonium Polymer (Wt. %) | Dry Peel (lbs/inch) | Perchloroethylene Soaked Peel (lbs/inch) | Volume Swelling Ratio in DMF |
|---|---|---|---|---|
| 10 | none | 11 | fell apart | D |
| 10 | 3 | 7 | 0.22 | 6.8 |
| 11 | none | 6 | fell apart | D |
| 11 | 3 | 12 | 0.10 | 8.6 |

EXAMPLE 103

The polymers from Examples 18, 19 and 20 were blended with 1.5 and 3% (based on solids) of the chlorohydroxypropyl quaternary ammonium polymers of Example 21 diluted to 20% solids, activated with 5% NaHCO$_3$ (solids-on-solids) and padded onto ½ oz./sq. yd. non-woven rayon web with 100% wet pickup. The web was cured by air-drying for seven days. The cured web was cut into 1"×4" test specimens, boiled in water for 15 minutes and quenched in cool water, or soaked in perchloroethylene for 15 minutes and tensile data then determined at room temperature on an Instron Tensile test machine at a crosshead speed of 10 inches per minute. Samples of the cured web were also cut into 12"×12" test specimens, placed into a home washing machine, with six terrycloth bath towels as ballast, and washed with 0.25 cup of Orvus ® (Procter & Gamble) detergent at 140° F. Other 12"×12" test specimens were placed in a commercial dry-cleaning machine with perchlorethylene and surfactant. The wash and dry-clean cycles were repeated until the web broke apart—the number of cycles survived is reported. Other samples of the blends were used to determine the volume swelling ratio by the method given in examples 26–101. The data are reported in the following table.

TABLE II

Tensile and Wash and Dryclean Durability

| Polymer from Ex. No. | Wt. % Polymer From Ex. 21 | Tensile, oz./in. H$_2$O Wet | Tensile, oz./in. PCE Wet | Cycles Survived Wash | Cycles Survived Dry-Clean | Volume Swelling Ratio in DMF |
|---|---|---|---|---|---|---|
| 17 | none | $a$ | 1.3 | 0 | 0 | D |
| 19 | none | $a$ | 1.1 | 0 | 0 | D |
| 20 | 1.5 | 6.2 | 7.0 | 9 | 8 | 8.4 |
| 18 | 3 | 3.2 | 5 | 6 | 5 | 25.8 |
| 19 | 1.5 | 4.6 | 8.1 | 8 | 11 | 8.8 |
| 19$^b$ | 3$^b$ | 4.6 | 7.6 | 13 | 11 | 8.7 |

$^a$Fell apart
$^b$This blend was subjected to a viscosity stability test by holding the blend for seven days at 100° F. The blend was found to be stable.

We claim:
1. A composition suitable for films, coatings, binders and adhesives consisting essentially of:
   A. an emulsion of a copolymer of an ethylenically unsaturated carboxylic acid and one or more comonomers, said ethylenically unsaturated acid being about 0.1 to 20% by weight of said copolymer and
   B. an aqueous solution of a polymer of at least 10% by weight of one or more monomers of the formula:

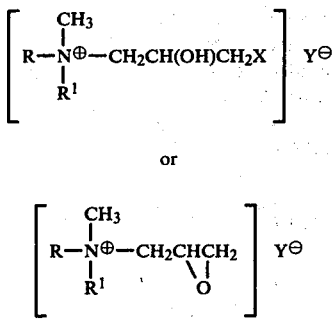

or mixtures thereof wherein
R is an ethylenically unsaturated group;
R$^1$ is a linear C$_1$ to C$_4$ alkyl or hydroxyalkyl group;
X is chlorine, bromine, or iodine; and Y$^-$ is an anion; the ratio of B to A being about 1/1000 to 1/1.

2. Composition of claim 1 wherein polymer B is prepared by solution polymerization.
3. Composition of claim 1 wherein R in the formula is CH$_2$=C(R$^4$)—C(O)Z—A— wherein
   R$^4$ is H or CH$_3$—;
   Z is O or —NR$^5$—;
   R$^5$ is H or C$_n$H$_{2n+1}$;
   n is 1 to 10; and
   A is a C$_2$ to C$_4$ alkylene or a polyalkylene group of the formula —(CH$_2$CH$_2$O)$_x$CH$_2$CH$_2$ wherein x is 1 to 100.
4. Composition of claim 1 wherein said polymer B is a copolymer.
5. Composition of claim 4 wherein said other ethylenically unsaturated monomer is an acrylate ester of a C$_1$-C$_8$ alcohol, a vinyl aromatic monomer, a vinyl ester, or an unsaturated amide.
6. Composition of claim 5 wherein said other monomer is an acrylate ester of a C$_2$-C$_4$ alcohol, styrene, or acrylamide.
7. Composition of claim 1 wherein said acid copolymer is a copolymer of one or more ethylenically unsaturated monomers and a minor amount of an unsaturated acid monomer.
8. Composition of claim 1 wherein said carboxylic acid copolymer is a copolymer of monomers selected from methyl methacrylate, an acrylate of a C$_2$-C$_4$ alcohol, vinyl acetate and styrene, and 0.3 to 10% by weight of acid monomers selected from acrylic, methacrylic, and itaconic acids.
9. Process of producing tough, solvent-resistant, reacted binders, adhesives or coatings from the composition of claim 7 comprising activating said composition with base and then applying it to a substrate.
10. Process in accordance with claim 9 wherein said composition is cured at room temperature without heating.
11. A crosslinked polymer produced by the process of claim 9.
12. A fabric laminate coated impregnated with the composition of claim 8.
13. A nonwoven fabric coated or impregnated with the composition of claim 8.

* * * * *